(12) United States Patent
Bowers et al.

(10) Patent No.: US 11,932,204 B2
(45) Date of Patent: Mar. 19, 2024

(54) SIDE STEP KIT FOR VEHICLE, AND VEHICLE INCLUDING SIDE STEP ASSEMBLY

(71) Applicant: Honda Motor Co., Ltd., Tokyo (JP)

(72) Inventors: Lee N. Bowers, Springfield, OH (US); Jared C. Alquist, Dublin, OH (US); Jianguo Wang, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 17/578,098

(22) Filed: Jan. 18, 2022

(65) Prior Publication Data

US 2023/0226980 A1    Jul. 20, 2023

(51) Int. Cl.
    *B60R 3/00*     (2006.01)
    *B62D 25/02*     (2006.01)
    *B62D 65/16*     (2006.01)

(52) U.S. Cl.
    CPC .............. *B60R 3/007* (2013.01); *B60R 3/002* (2013.01); *B62D 25/025* (2013.01); *B62D 65/16* (2013.01)

(58) Field of Classification Search
    CPC ....... B60R 3/007; B60R 3/002; B62D 25/025; B62D 65/16
    See application file for complete search history.

(56) References Cited

U.S. PATENT DOCUMENTS

| | | | | |
|---|---|---|---|---|
| 5,893,424 A | * | 4/1999 | Hisada | B62J 25/04 74/564 |
| 6,113,121 A | * | 9/2000 | Mizuta | B60N 3/06 280/164.2 |
| 6,116,630 A | * | 9/2000 | Thomas | B62J 25/06 280/291 |
| 6,224,134 B1 | * | 5/2001 | Johnson | B60R 9/00 280/163 |
| 6,270,106 B1 | * | 8/2001 | Maki | B62K 5/01 180/21 |
| 6,296,163 B1 | * | 10/2001 | Kitao | B62J 7/06 410/101 |
| 6,502,863 B1 | * | 1/2003 | Takahashi | B62K 5/01 280/847 |
| 6,682,085 B2 | * | 1/2004 | Furuhashi | B62J 25/04 182/150 |

(Continued)

FOREIGN PATENT DOCUMENTS

DE     102008056772 A1     8/2009

*Primary Examiner* — Jeffrey J Restifo
(74) *Attorney, Agent, or Firm* — KENEALY VAIDYA LLP

(57) ABSTRACT

A side step assembly can be installed on a side-by-side all-terrain vehicle. The side step kit can include a vehicle step stay and a side step cover. The vehicle step stay can include a first stay member and a second stay member. The first stay member can be configured to be attached onto a frame assembly of the vehicle. The second stay member can be configured to be attached to the first stay member and onto the frame assembly. The side step cover can be supported by the vehicle step stay when the vehicle step stay is connected to the frame assembly and the side step cover is mounted on the vehicle step stay. The side step cover can include a tread surface extending above and along the first stay member when the side step cover is mounted on the vehicle step stay.

20 Claims, 11 Drawing Sheets

(56) References Cited

U.S. PATENT DOCUMENTS

| | | | |
|---|---|---|---|
| 7,404,568 B1 * | 7/2008 | Portelance | B62J 25/08 |
| | | | 180/908 |
| 7,537,227 B1 | 5/2009 | Polka | |
| 7,594,671 B2 * | 9/2009 | Danze | B62K 5/01 |
| | | | 280/163 |
| 7,607,673 B1 * | 10/2009 | Vey | B62J 25/04 |
| | | | 280/163 |
| 8,109,556 B2 | 2/2012 | Bergman et al. | |
| 8,973,693 B2 | 3/2015 | Kinsman et al. | |
| 10,611,419 B2 | 4/2020 | Spindler et al. | |
| 10,843,743 B2 | 11/2020 | St-Pierre et al. | |
| 11,014,419 B2 | 5/2021 | Danielson et al. | |
| 11,066,105 B2 * | 7/2021 | Lutz | B60J 10/86 |
| 2002/0038737 A1 | 4/2002 | Morishita et al. | |
| 2003/0025289 A1 * | 2/2003 | Furuhashi | B60R 3/002 |
| | | | 280/163 |
| 2019/0031260 A1 * | 1/2019 | Filion | B62D 65/024 |
| 2020/0010120 A1 * | 1/2020 | Kinsman | B60G 21/055 |
| 2023/0134397 A1 * | 5/2023 | Tanaka | B62J 25/04 |
| | | | 280/80.1 |
| 2023/0226980 A1 * | 7/2023 | Bowers | B62D 65/16 |
| | | | 280/163 |

* cited by examiner

SIDE STEP KIT FOR VEHICLE, AND VEHICLE INCLUDING SIDE STEP ASSEMBLY

BACKGROUND

The disclosed subject matter relates to a side step assembly for a vehicle. More particularly, the disclosed subject matter relates to methods and apparatus that can support a side step of a vehicle.

Vehicles configured for use on unimproved paths, such as but not limited to gravel paths, dirt trails, and unmarked paths can include a relatively high ground clearance between the bottom of the vehicle and the unimproved path. The high ground clearance can allow the vehicle to traverse uneven terrain, shallow waterways, and/or obstacles such as but not limited to rocks, small trees, etc. that are on or cross the unimproved path. The vehicle can include a side step adjacent each seat to assist ingress and egress of the passengers.

SUMMARY

Some embodiments are directed to a side step kit for a side-by-side all-terrain vehicle having a frame assembly and a plurality of wheels connected to the frame assembly. The side step kit can include a vehicle step stay and a side step cover. The vehicle step stay can include a first stay member and a second stay member. The first stay member can be configured to be attached onto the frame assembly. The second stay member can be configured to be attached to the first stay member and onto the frame assembly. The side step cover can be supported by the vehicle step stay when the vehicle step stay is connected to the frame assembly and the side step cover is mounted on the vehicle step stay. The side step cover can include a tread surface extending above and along the first stay member when the side step cover is mounted on the vehicle step stay.

Some embodiments are directed to a side-by-side all-terrain vehicle that can include a frame assembly, a step stay and a side step cover. The frame assembly can include a first frame member, a second frame member and a third frame member. The first frame member can extend along a longitudinal direction of the vehicle and terminate in the longitudinal direction at a first end. The second frame member can extend beyond the first end in the longitudinal direction of the vehicle and terminate in the longitudinal direction at a second end. The second frame member can be spaced away from the first frame member in a transverse direction of the vehicle. The third frame member can be mounted onto the second frame member and extend away from the second frame member along a vertical direction of the vehicle. The step stay can include a first stay member connected to the first end and the second frame member, and a second stay member connected to the first stay member and the third frame member. The side step cover can be mounted on and connected to the step stay and include a tread surface that extends beyond the first end of the first frame member in the longitudinal direction of the vehicle and is supported by the step stay.

Some embodiments are directed to a vehicle that can include a frame assembly, a plurality of wheels, a power source, a plurality of stay members, and a side step cover. The wheels can be connected to the frame assembly and at least one of the wheels can be separated from the frame assembly in a longitudinal direction of the vehicle by a space. The power source can be mounted on the frame assembly and selectively connected to the at least one of the wheels to selectively propel the vehicle. The stay members can be attached to the frame assembly and located in the space. The side step cover can include a tread surface that extends from the frame assembly and onto one of the stay members in the longitudinal direction of the vehicle.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

A vehicle can include a frame assembly that supports the passenger(s), cargo areas and a powertrain. The frame assembly can form an outer periphery of the vehicle at an intermediate stage of assembly of the vehicle. One or more peripheral structures of the frame assembly can be located between a worker and a center portion of the vehicle onto which the worker is assembling a part, component, system, etc. For example, the powertrain can include an internal combustion engine mounted onto a center portion of the frame assembly. The fame assembly can extend between the worker and the internal combustion engine and space the worker away from the internal combustion engine in a transverse direction of the vehicle.

The worker can perceive their physical movement and positioning relative to the frame assembly and the center portion of the vehicle to be uncomfortable when assembling the part, component, system, etc., onto the center portion of the vehicle. For example, the worker can perceive their reach or view of the center portion of the vehicle as uncomfortable. Thus, it is desirable to provide a layout of structure(s) about the outer periphery of vehicle that can improve the worker's perceived comfort during assembly of a part, component, system, etc., onto the center portion of the vehicle.

Figure 1:
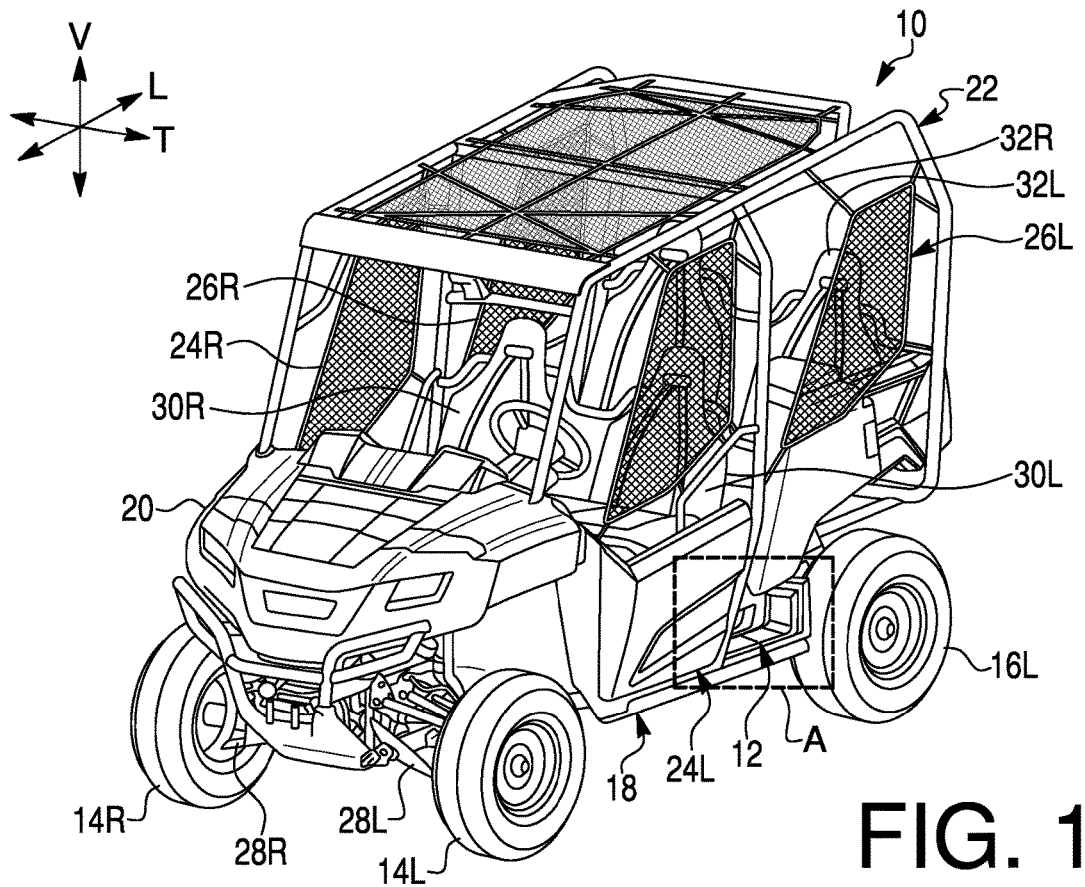
FIG. 1 is a perspective view of a vehicle including a side step assembly and a frame assembly made in accordance with principles of the disclosed subject matter.
Figure 2:
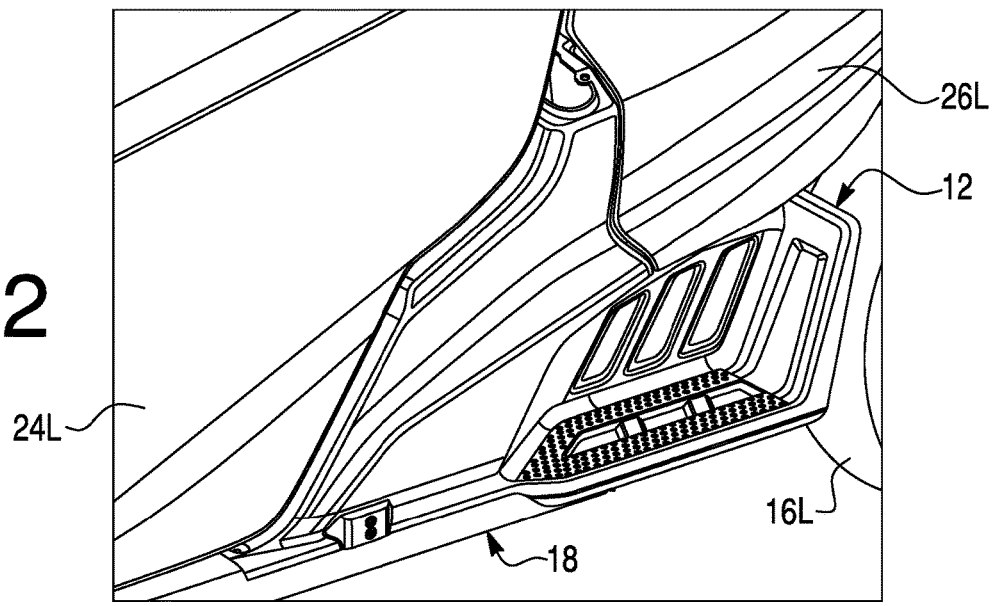
FIG. 2 is an enlarged portion A of FIG. 1.

FIG. 1 illustrates an embodiment of a vehicle 10 that can include a side step assembly 12 and a frame assembly 18 made in accordance with principles of the disclosed subject matter. FIG. 2 is an enlarged view of a portion A of FIG. 1. As will be discussed in further detail below, the frame assembly 18 can be configured to provide a space between the frame assembly 18 and either the left rear wheel 16L or the right rear wheel 16R in a longitudinal direction L of the vehicle 10. (The right rear wheel 16R is obscured from view in FIG. 1 and shown in phantom in FIG. 3). A worker can step into the space when assembling one or more part(s), component(s) and/or system(s) onto a center portion of the vehicle 10. Thus, the worker can get closer to a center portion of the vehicle 10 with respect to a transverse direction T of the vehicle 10 when assembling one or more part(s), component(s) and/or system(s) onto the center portion of the vehicle 10. This closer proximity to the center portion of the vehicle 10 can improve the worker's perceived comfort when assembling one or more part(s), component(s) and/or system(s) onto the center portion of the vehicle 10. The side step assembly 12 can be mounted onto the vehicle 10 after the one or more part(s), component(s) and/or system(s) has/have been assembled onto center portion of the vehicle 10. The side step assembly 12 can cover the space between the frame assembly 18 and the left rear wheel 16L or the right rear wheel 16R after the worker completes the one or more assembly task(s) for the center portion of the vehicle 10.

The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV). However, the disclosed frame assembly 18 and side step assembly 12 can be used with any vehicle that is configured for travel along any one or combination of improved, unimproved, and unmarked paths. For example, embodiments are intended to include any type of vehicle or automobile, including a passenger car, minivan, truck, tractor, boat, other types of all-terrain vehicles (ATV), semi-tractor, off-highway vehicle, etc. For example, embodiments can include configurations of the frame assembly 18 and side step assembly 12 for use in still other types of vehicles, such as an autonomous wheeled vehicle, a non-motorized wheeled vehicle, a continuous tracked vehicle, etc.

The vehicle 10 can include a body 20, a pair of front wheels 14L, 14R, a pair of rear wheels 16L, 16R, a rollover protection structure 22, a pair of front door assemblies 24L, 24R, a pair of rear door assemblies 26L, 26R, a pair of front suspension assemblies 28L, 28R, a pair of rear suspension assemblies and a powertrain. The right rear wheel 16R, the rear suspension assemblies and the powertrain are hidden from view in FIG. 1 by the body 20, the door assemblies 24L, 26L and the side step assembly 12. The frame assembly 18 can include the rollover protection structure 22. The side step assembly 12 can be connected to the frame assembly 18 and cover a respective space located between the frame assembly 18 and either the left rear wheel 16L or the right rear wheel 16R.

The vehicle 10 can include a pair of front seats 30L, 30R and a pair of rear seats 32L, 32R mounted in a passenger space of the vehicle 10. The front seats 30L, 30R can be arranged side-by-side in the transverse direction T of the vehicle 10. The rear seats 32L, 32R can be arranged side-by-side in the transverse direction T of the vehicle 10. The rear seats 32L, 32R can be spaced behind the front seats 30L, 30R in the longitudinal direction L of the vehicle 10.

Figure 3:
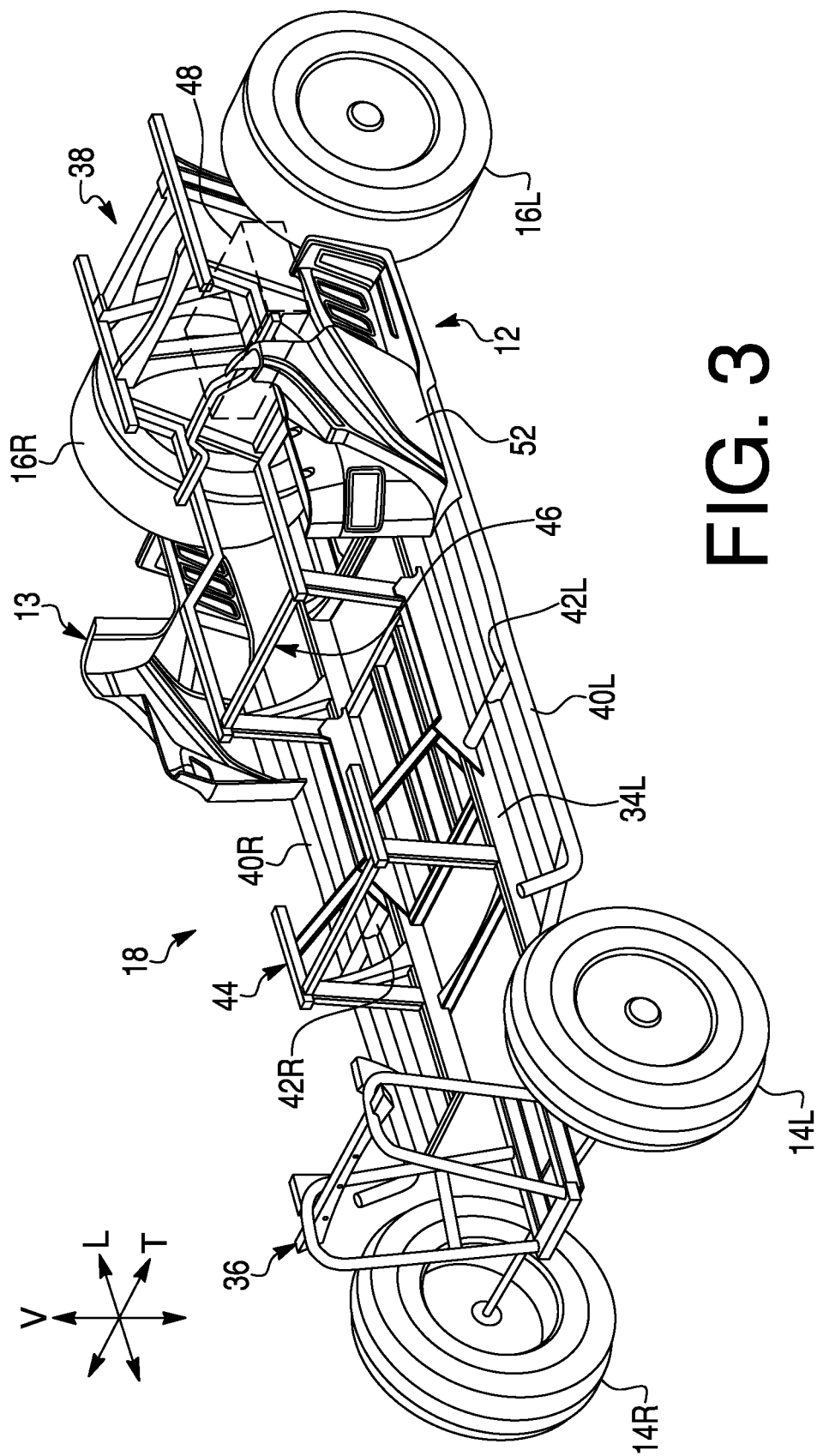
FIG. 3 is a front perspective view of a frame assembly and the side step assembly of the vehicle of FIG. 1.

Referring to FIG. 3, the frame assembly 18 can include a pair of main frame members 34L, 34R, a front frame assembly 36, a rear frame assembly 38, a pair of outboard frame members 40L, 40R, a pair of first transverse members 42L, 42R a front seat frame assembly 44 and a rear seat frame assembly 46.

The main frame members 34L, 34R can be straight with a hollow rectangular shape in cross section. The mainframe members 34L, 34R can extend in the longitudinal direction L of the vehicle 10 and be spaced away from each other in the transverse direction T of the vehicle 10. The main frame members 34L, 34R can support the front seat frame assembly 44 and the rear seat frame assembly 46.

Front frame assembly 36 can be connected to a front end of the main frame members 34L, 34R in the longitudinal direction L of the vehicle 10. Referring to FIG. 1, the front suspension assemblies 28L, 28R can be mounted onto the front frame assembly 36. Each of the front suspension assemblies 28L, 28R can include one or more links that connect the front wheels 14L 14R to move relative to the frame assembly 18 in the vertical direction V of the vehicle 10. The front suspension assemblies 28L, 28R are omitted from FIG. 3 for clarity and simplicity of the drawing.

Returning to FIG. 3, the rear frame assembly 38 can be connected to a rear end of the main frame members 34L, 34R in the longitudinal direction L of the vehicle 10. Rear suspension assemblies for the rear wheels 16L 16R can be mounted onto the rear frame assembly 38. The rear suspension assemblies are omitted from FIG. 3 for clarity and simplicity of the drawing. Each of the rear suspension assemblies can include one or more links that connect the rear wheels 16L 16R to move relative to the frame assembly 18 in the vertical direction V of the vehicle 10.

The vehicle 10 can include a powertrain 48 that can be connected to at least the rear wheels 16L, 16R to selectively propel the vehicle 10. The powertrain 48 is schematically represented and shown in phantom in FIG. 3.

The front seat frame assembly 44 and the rear seat frame assembly 46 can be mounted on and connected to each of the main frame members 34L, 34R in any appropriate manner. The front seats 30L, 30R can be connected to and supported by the front frame assembly 44. The rear seats 32L, 32R can be connected to and supported by the rear seat frame assembly 46.

The side step assembly 12 is shown on the left side of the vehicle 10 in FIGS. 1-3. The vehicle 10 can include a side step assembly 13 that is on the right side of the vehicle 10. The side step assembly 13 can include structure that is a mirror image of the structure of the sidestep assembly 12. The side step assembly 13 is described herein with respect to the side step assembly 12. The structure of the right side of the frame assembly 18 can mirror the structure of the left side of the frame assembly 18 described below.

Figure 4:
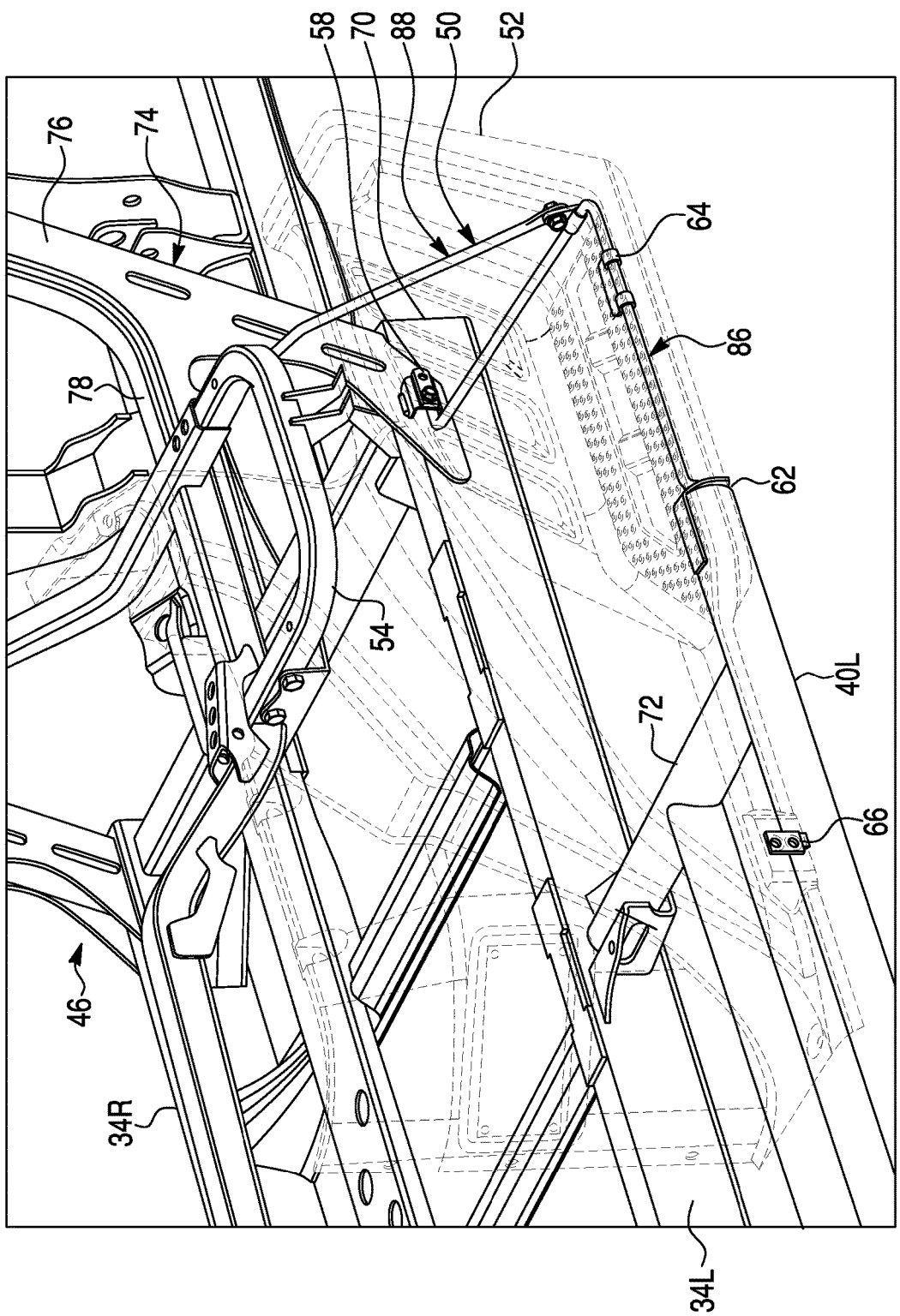
FIG. 4 is an enlarged perspective view of a portion of FIG. 3 with the side step cover shown in phantom.
Figure 5:
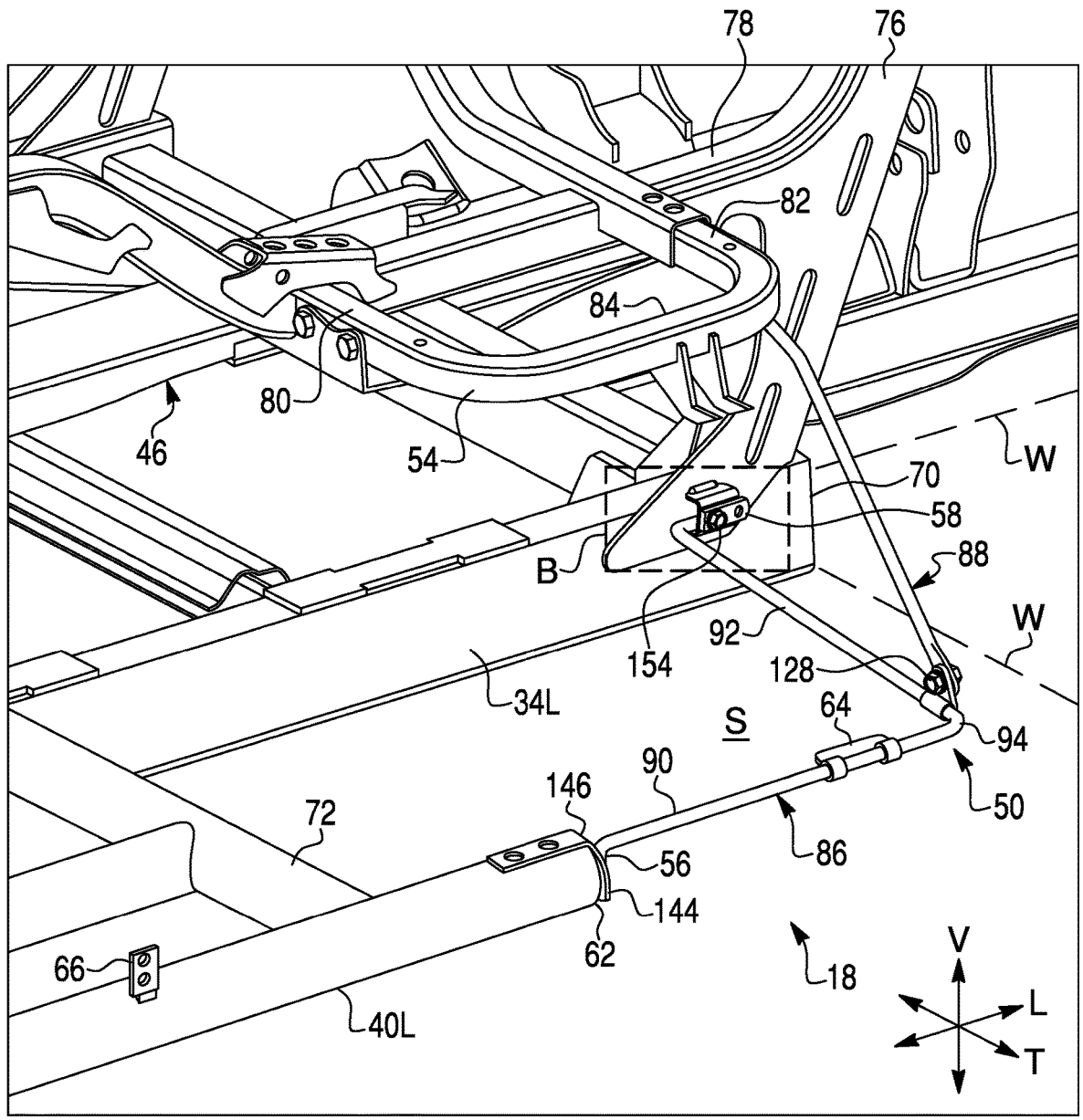
FIG. 5 is a perspective view of the frame assembly and the step stay of FIG. 4 with the side step cover omitted.

FIGS. 4 and 5 show an enlarged portion of FIG. 3 where a side step cover 52 of the side step assembly 12 is shown in phantom in FIG. 4 and omitted from FIG. 5. FIGS. 4 and 5 show a portion of the frame assembly 18 that is adjacent the left rear wheel 16L of the vehicle 10. The dotted line region W in FIG. 5 schematically represents the location of the left rear wheel 16L with respect to the frame assembly 18. A space S located adjacent to the region W can extend between the region W and the frame assembly 18 in each of the longitudinal direction L, the transverse direction T and the vertical direction V of the vehicle 10. A worker assembling part(s), component(s) and system(s) onto the vehicle 10 can enter into the space S in order to stand adjacent to the left main frame member 34L. Thus, the worker can perceive a more comfortable reach and better visibility of the center portion of the frame assembly 18 and other structures of the vehicle 10 as compared to being limited to standing outside of the space S in the transverse direction T of the vehicle 10. The side step assembly 12 can be mounted onto the vehicle 10 after access to the space S is no longer advantageous for the worker.

Figure 6:
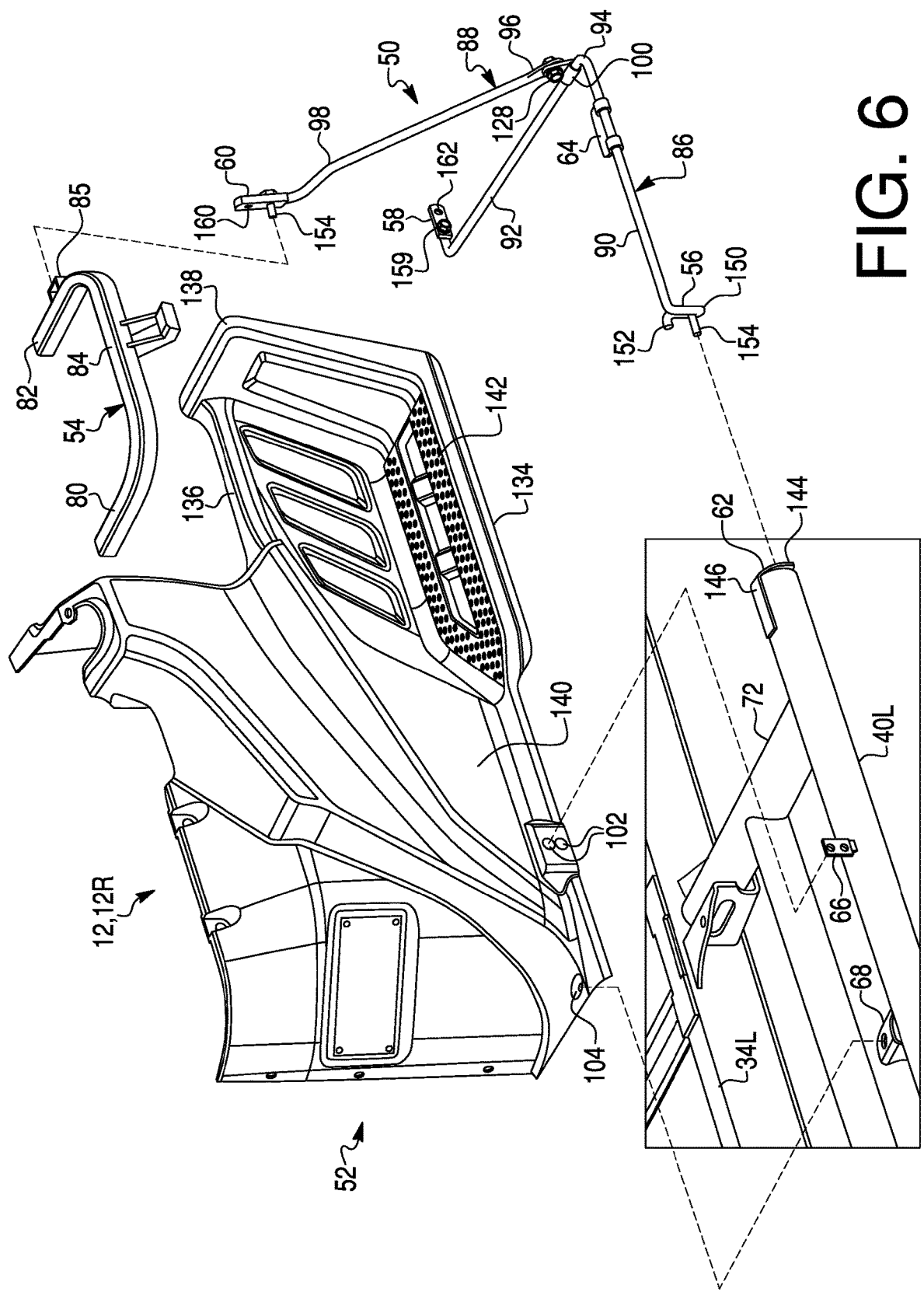
FIG. 6 is an exploded perspective view of the side step assembly and a portion of the frame assembly of FIG. 3.

Referring to FIGS. 4-6 collectively, the side step assembly 12 can include a step stay 50 and a side step cover 52. FIG. 4 shows the side step cover 52 in phantom and FIG. 5 shows the frame assembly 18 and the step stay 50 before the side step cover 52 has been mounted onto the vehicle 10. The frame assembly 18 can include a support bracket 54 that is a component of the rear seat frame assembly 46. The step stay 50 can be connected to the left main frame member 34L, the left outboard frame member 40L and the support bracket 54. The side step cover 52 can be mounted onto and supported by the left outboard frame 40L and the support bracket 54 in an appropriate manner. Exemplary connections and mounting structures will be described with later reference to FIGS. 11-15. The step stay 50 and the side step cover 52 can extend into the space S indicated in FIG. 5.

Figure 7:
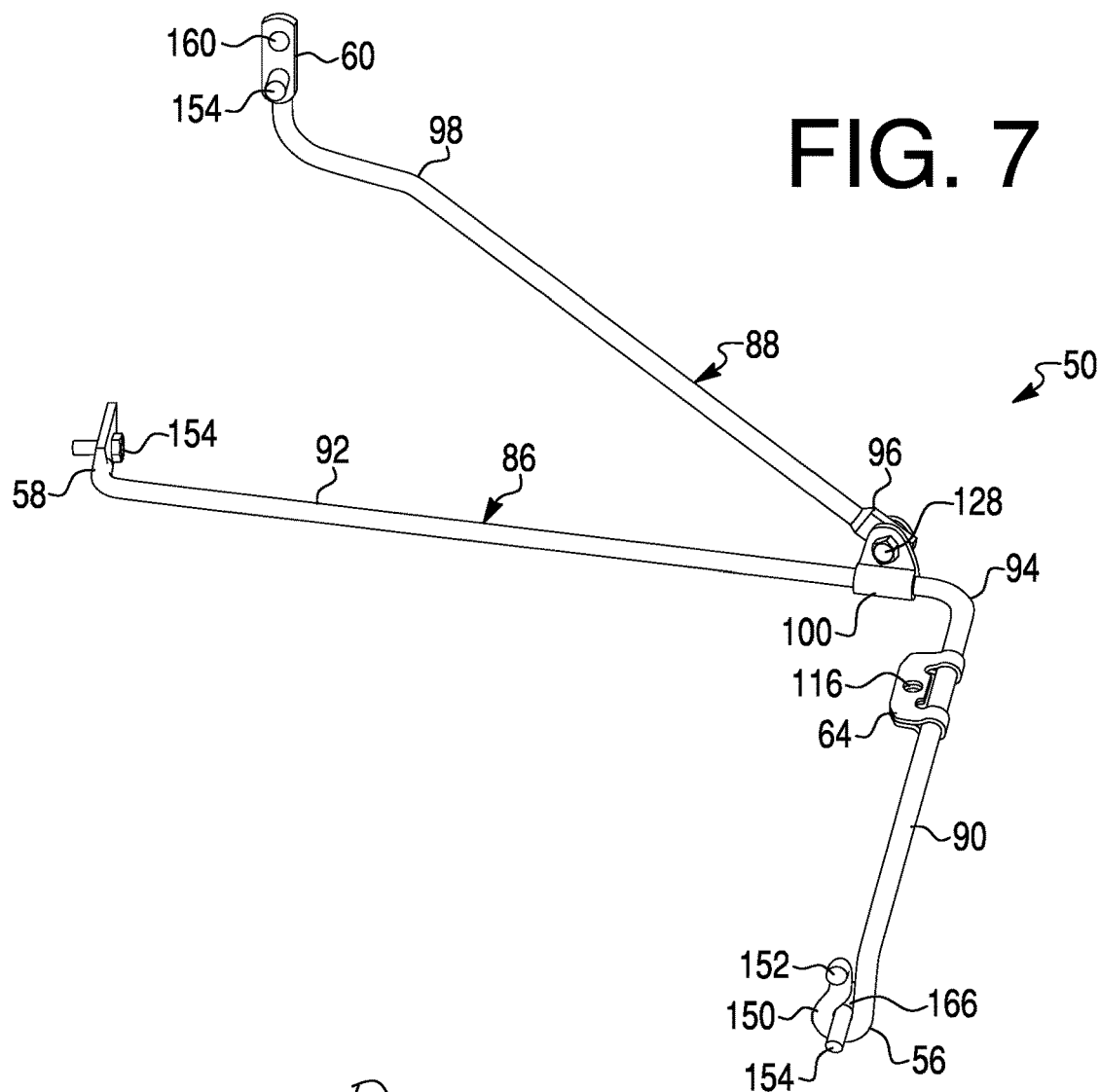
FIG. 7 is a perspective view of a step stay of the side step assembly of FIG. 4.

Referring to FIGS. 5-7, the step stay 50 can include a first end 56, a second end 58 and a third end 60. The left outboard frame member 40L can terminate in the longitudinal direction L at an end 62. The first end 56 can be connected to the end 62 of the left outboard frame member 40L. The second end 58 can be connected to the left main frame member 34L. The third end 60 can be connected to the support bracket 54. The step stay 50 can include a step mounting tab 64 and the side step cover 54 can be connected to the step mounting tab 64.

Referring to FIG. 6, the left outboard frame member 40L can include a first mounting bracket 66 and a second mounting bracket 68. The side step cover 52 can include a pair of mounting holes 102 and a mounting hole 104. Appropriate fasteners, such as but not limited to a plastic clip, a threaded fastener, or a clamp, can be used to connect the side step cover 52 to the first mounting bracket 66 via the mounting holes 102 and the second mounting bracket 68 via the hole 104.

Referring to FIGS. 5 and 6, the left main frame member 34L can extend beyond the end 62 of the left outboard frame member 40L in the longitudinal direction L of the vehicle 10. The end 70 of the main left main frame member 34L can be closer to the left rear wheel 16L than the end 62 of the left outboard frame member 40L in the longitudinal direction L of the vehicle 10. The side step assembly 12 can bridge the space S and extend between the ends 62, 70 in the longitudinal direction L and the transverse direction T of the vehicle 10.

Figure 12:
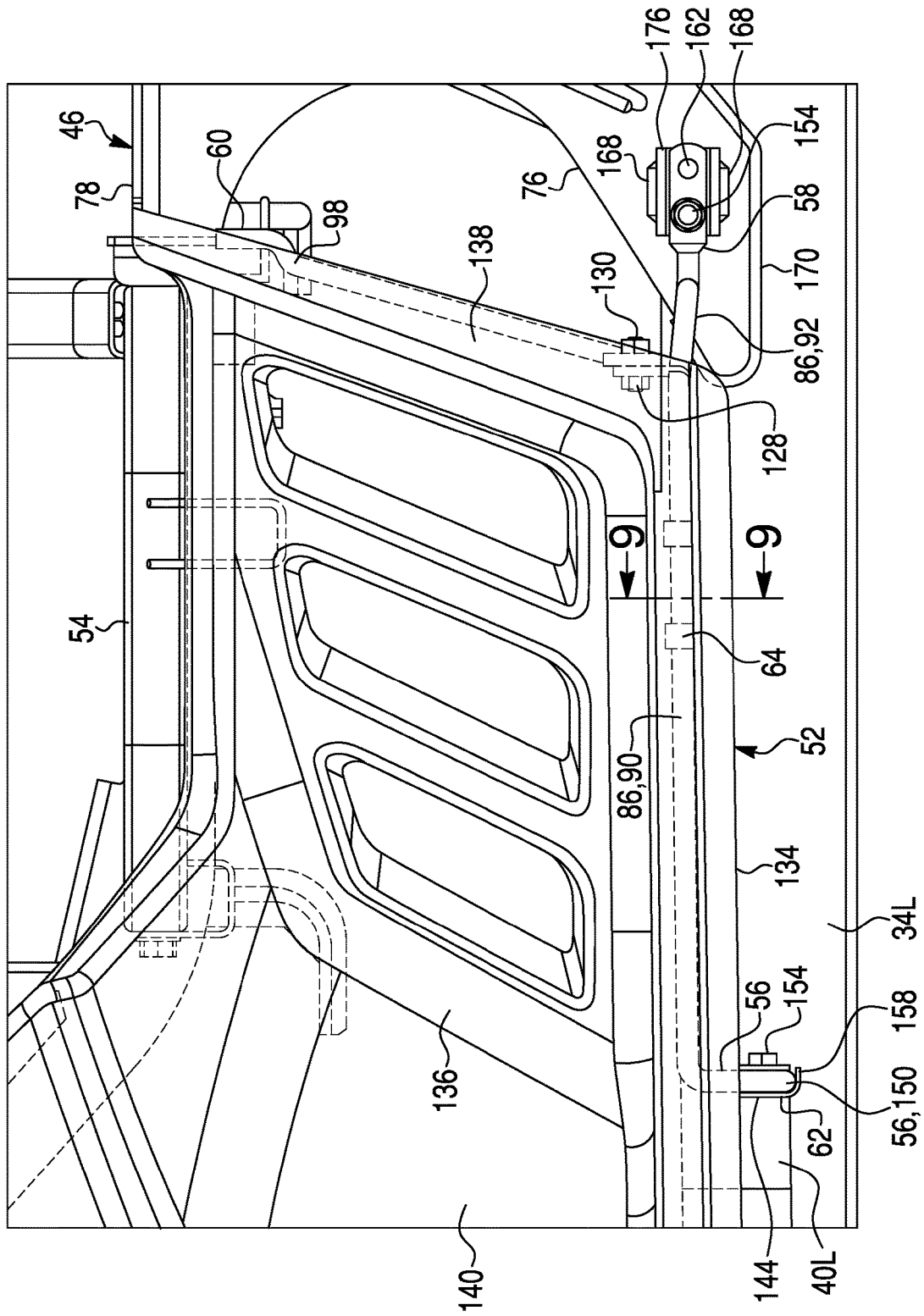
FIG. 12 is a side view of the frame assembly and side step assembly of FIG. 3.
Figure 14:
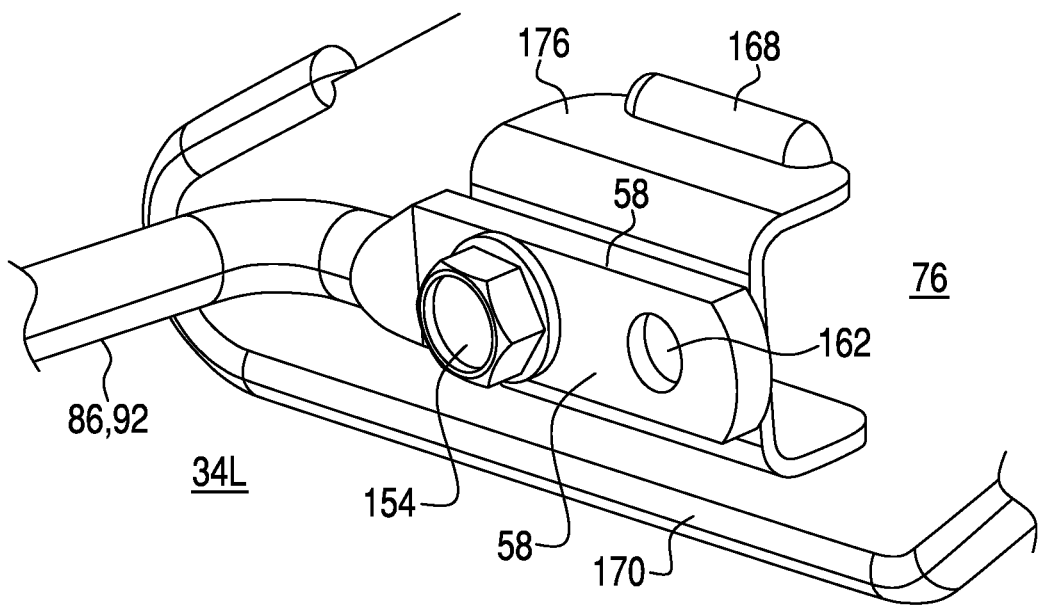
FIG. 14 is a rear perspective view of an enlarged portion B of FIG. 5 and shows a connection between a second end of the step stay and the frame assembly.

Referring to FIGS. 4 and 5, the rear seat frame assembly 46 can include a frame member 74 that is connected to the left main frame member 34L adjacent to the end 70. The frame member 74 can include an upright portion 76 and an extension 78. The upright portion 76 can be connected to the left main frame member 34L in an appropriate manner such as but not limited to a weld seam 170 as shown in FIGS. 12 and 14. The upright portion 76 can extend away from the left main frame member 34L in the longitudinal direction L and the vertical direction V of the vehicle 10. The extension 78 can extend from the upright portion 76 toward the front frame assembly 36 in the longitudinal direction L of the vehicle 10. The extension 78 can be spaced above the left main frame member 34L in the vertical direction V of the vehicle 10 and spaced inwardly from the left outboard frame member 40L in the transverse direction T of the vehicle 10.

The support bracket 54 can be connected to and extend away from the extension 78. The support bracket 54 can extend away from the extension 78 in the transverse direction T of the vehicle 10. Referring to FIGS. 5 and 6, the support bracket 54 can have a general U shape that includes a pair of legs 80, 82 and a base 84. The legs 80, 82 can extend away from the extension 78 in the transverse direction T of the vehicle 10. The base 84 can extend from each of the legs 80, 82 in the longitudinal direction L of the vehicle 10 and be connected to each of the legs 80, 82.

Figure 13:
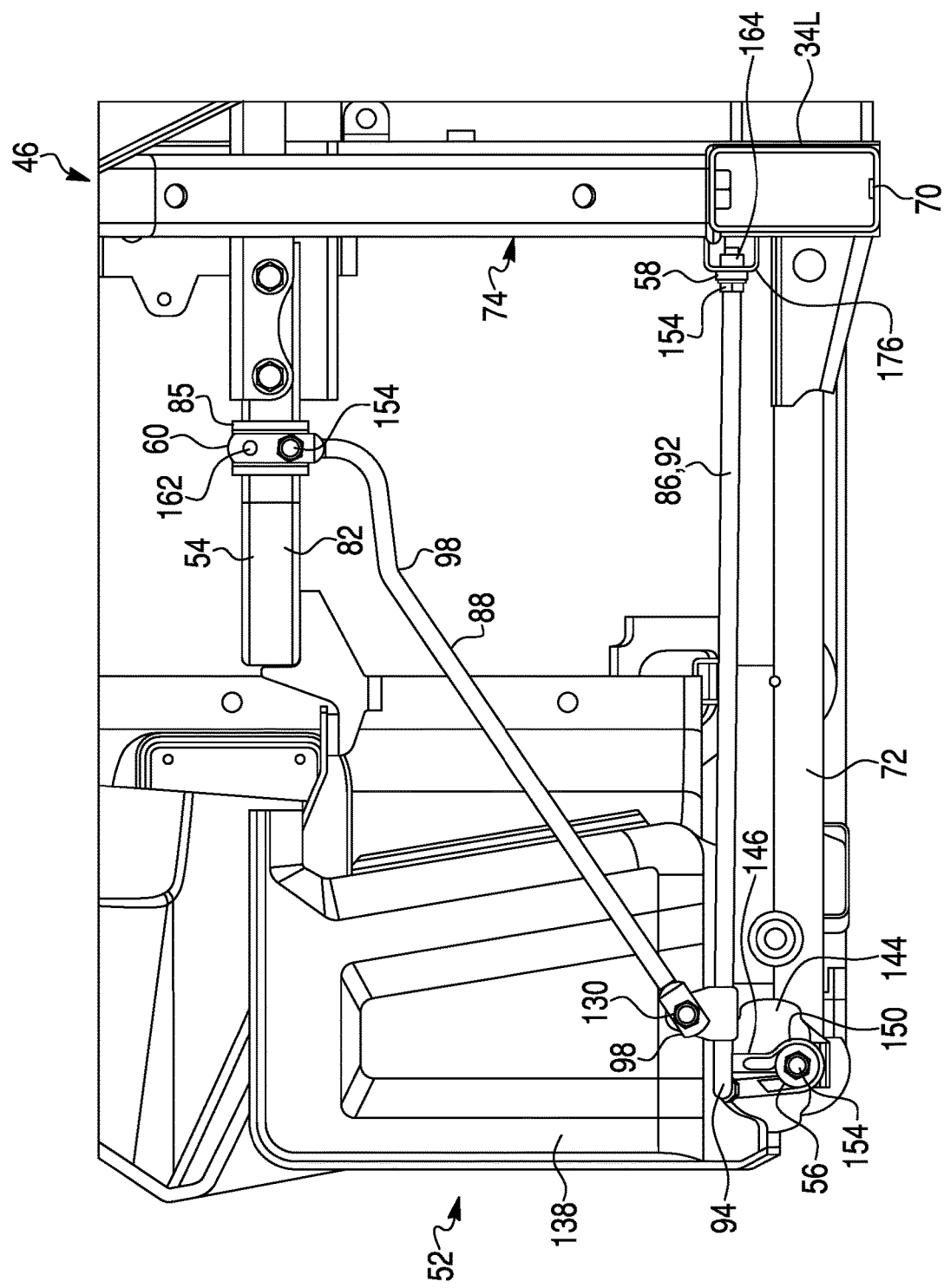
FIG. 13 is a rear end view of the frame assembly and side step assembly of FIG. 3.

Referring to FIGS. 6 and 13, the support bracket 54 can include a mounting bracket 85. The third end 60 of the step stay 50 can be connected to the mounting bracket 85.

Referring to FIGS. 6 and 7, the step stay 50 can include a first stay member 86 and a second stay member 88. The first stay member 86 can extend in the transverse direction T and the longitudinal direction L of the vehicle 10. The first stay member 86 can be referred to as a horizontal member when connected to the frame assembly 18. The second stay member 88 can extend upwardly away from the first stay member 86 and be inclined with respect to the transverse direction T and the vertical direction V of the vehicle 10 when connected to the frame assembly 18.

The first stay member 86 can include a first portion 90, a second portion 92, a bend 94, the first end 56 and the second end 58. The first portion 90 can include the first end 56 and extend from the first end 56 to the bend 94 in the longitudinal direction L of the vehicle 10. The second portion 92 can include the second end 58 and extend from second end 58 to the bend 94 in the transverse direction T of the vehicle 10. The bend 94 can be connected to and located between the first portion 90 and the second portion 92. The first stay member 86 can be formed in an L-shape with the first portion 90 and can be orthogonal to or substantially orthogonal to the second portion 92 such that one of ordinary skill in the art would perceive the first and second portions 90, 92 to be orthogonal to each other. The step mounting tab 64 can be connected to the first portion 90 at a location that is between the first end 56 and the bend 94.

Referring to 5, the second portion 92 and the second stay member 88 can be located between the left rear wheel 16L as represented by the region W) and the first end 62 of the left outboard frame member 40L in the longitudinal direction L of the vehicle 10.

The second stay member 88 can include the third end 60, a stay end 96 and a bend 98 that is located between the third end 60 and the stay end 96. The step stay 50 can include a stay mounting tab 100 connected to the first stay member 86. The stay end 96 of the second stay member 88 can be connected to the stay mounting tab 100. The stay mounting tab 100 can be located between the second end 58 and the bend 94 of the first stay member 86. The bend 94 in the first stay member 86 can be located between the stay mounting tab 100 and the step mounting tab 64.

Referring to FIG. 4, the first stay member 86 of step stay 50 can form a rigid frame that extends across the space S in the longitudinal direction L and the transverse direction T of the vehicle 10. The first stay member 86 can be cantilevered to the frame members 34L, 40L with the bend 94 as the free end. The second stay member 88 can span from the support bracket 54 to the bend 94 to support the cantilevered end of the first stay member 86. Thus, the step stay 50 can support the side step cover 52 across the space S.

The frame assembly 18 can include a rear transverse member 72 that extends from and is connected to the left main frame member 34L and the left outboard frame member 40L. The rear transverse member 72 can extend in the transverse direction T of the vehicle 10. The rear transverse member 72 can be spaced away from the end 70 of the left main frame member 34L in the longitudinal direction L of the vehicle 10 and adjacent to the end 62 of the left outboard frame member 40L. The rear transverse member 72 can be closer to the end 62 of the left outboard member 40L than to the end 70 of the left main frame member 34L in the longitudinal direction L of the vehicle 10. The rear transverse member 72, the left outboard frame member 38L, the first stay member 86 and the left main frame member 34L can bound an area in the space S. The area can lie in a plane that extends in the transverse direction T and the longitudinal direction L of the vehicle 10. The first stay member 86 can lie in this plane. The side step cover 52 can cover the area.

The vehicle 10 can be configured to travel off-road along an unimproved path and can encounter uneven terrain and objects that protrude from the ground surface such as but not limited to rocks and tree branches. During operation of the vehicle 10, it can be possible for the first stay member 86 to strike the ground surface or an object protruding from the ground surface. The first stay member 86 can input a load into the second stay member 88 when the first stay member 86 strikes the ground surface or an object protruding from the ground surface. The bend 98 in the second stay member 88 can have a predetermined shape and location that permits the second stay member 88 to elastically deform at the bend 98 in predetermined manner in response to an input load that is less than a predetermined load threshold. For example, the bend 98 in the second stay member 88 can be located closer to the second end 58 than to the stay end 96 and the bend 98 can form an included angle that is an obtuse angle.

Referring to FIG. 6, the side step cover 52 can include a bottom wall 134, a side wall 136, an end wall 138 and a cover panel 140.

The bottom wall 134 can extend along the transverse direction T and the longitudinal direction L of the vehicle 10. The bottom wall 134 can include a tread surface 142 that has predetermined raised surface pattern or roughened surface pattern. The bottom wall 134 and the step stay 50 can support a person standing on the side step assembly 12.

The side wall 136 can extend away from the bottom wall 134 in the vertical direction V of the vehicle 10 and can extend along the bottom wall 134 in the longitudinal direction L of the vehicle 10.

The end wall 138 can extend away from the bottom wall 134 in the vertical direction V and the longitudinal direction L of the vehicle 10. The end wall 138 can extend along the bottom wall 134 in the transverse direction T of the vehicle 10. The end wall 138 can abut the sidewall 136.

The cover panel 140 can extend away from the bottom wall 134 in the longitudinal direction L and the vertical direction V of the vehicle 10. The cover panel 140 can extend away from the side wall 136 in the longitudinal direction L of the vehicle 10. The cover panel 140 and the side panel 136 can collectively cover the rear seat frame assembly 46 from view from outside of the vehicle 10.

Figure 9:
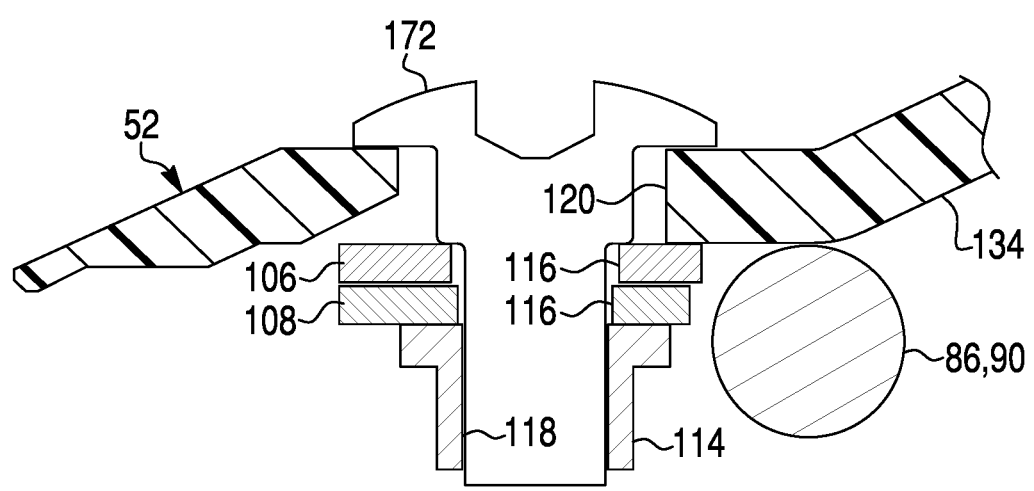
FIG. 9 is a cross-sectional view taken along line 9-9 of FIG. 12.
Figure 10:
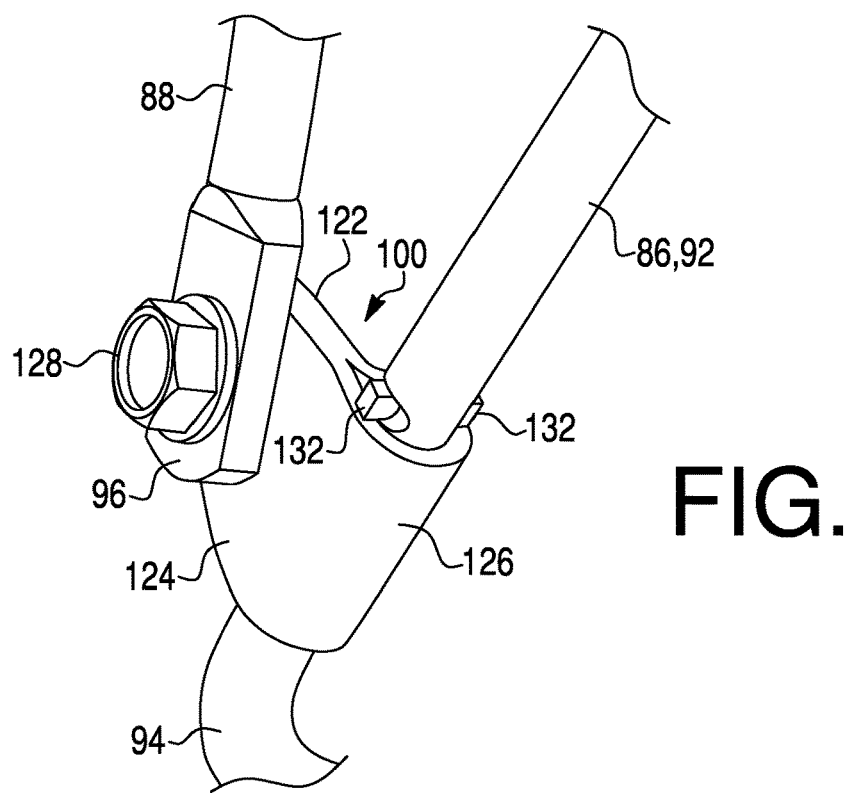
FIG. 10 is a perspective view of a stay mounting tab and portions of the first rod and a second rod of the step stay of FIG. 7.

The side step assembly 12 can be configured to be intentionally removed from the vehicle 10 without destroying the integrity of the frame assembly 18 or the side step assembly. Referring to FIGS. 6, 7 and 10, the second stay member 88 can be removably secured to the stay mounting tab 100 by a bolt 128. Referring to FIGS. 5-7 and 11-14, the step stay 50 can be secured to the frame assembly 18 with a plurality of bolts 154. Referring to FIG. 9, the side step cover 52 can be connected to the step stay 50 with a bolt 172.

Figure 8:
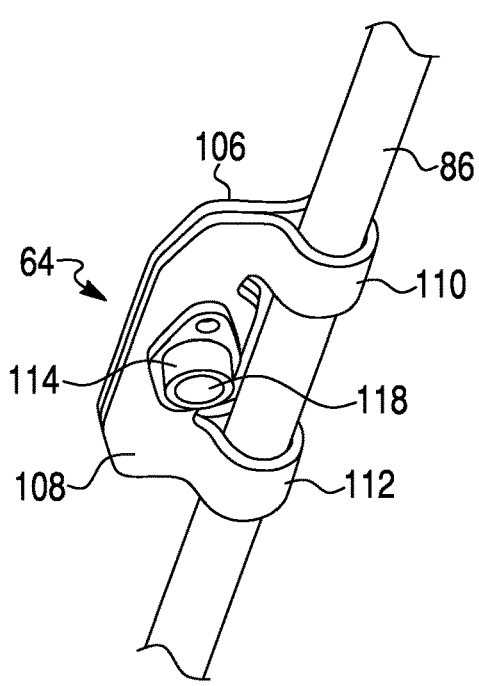
FIG. 8 is a perspective view of the bottom of a step mounting tab and a portion of a first rod of the step stay of FIG. 7.

Referring to FIGS. 7 and 8 collectively, the step mounting tab 64 can include a pair of plate parts 106, 108, a pair of cylindrical parts 110, 112 and a nut 114. The step mounting tab 64 can be formed or stamped from a flat metal plate and then folded around the first stay member 86 to form the cylindrical parts 110, 112 and to overlap the plate parts 106, 108 onto each other. The plate parts 106, 108 can be connected together in any appropriate manner such as but not limited to a weld, an adhesive, or plastic deformation during the forming of the cylindrical parts 110, 112. The cylindrical parts 110, 112 can be formed with an inner diameter that is greater than the outer diameter of the first stay member 86 so that the step mounting bracket 64 can freely rotate about and slide along the first stay member 86.

A through hole 116 can be formed in each of the plate parts 106, 108. FIG. 7 shows the through hole 116 in the upper plate part 106 and FIG. 9 shows the through holes 116 in both plate parts 106, 108. The through hole 116 in the lower plate part 108 is obstructed from view in FIG. 8 by the nut 114. The nut 114 can be welded onto the lower plate part 108 with the through hole 118 of the nut aligned with the through holes 116 of the plate parts 106, 108.

Referring to FIG. 9, the side step cover 52 can include a through hole 120. The bolt 172 can be inserted into the through holes 116, 120 and threaded into the nut 114 to connect the side step cover 52 to the step mounting tab 64.

Referring to FIG. 10, the stay mounting tab 100 can include a pair of plate parts 122, 124 and a cylindrical part 126. The stay mounting tab 100 can be stamped from a flat metal plate that is folded around the second stay member 88 to form the cylindrical part 126 and to overlap the plate parts 122, 124 onto each other. The plate parts 122, 124 can be connected together in any appropriate manner such as but not limited to a weld, an adhesive, or plastic deformation during the forming of the cylindrical part 126. The cylindrical part 126 can be formed with an inner diameter that is greater than the outer diameter of the second stay member 86 so that the stay mounting tab 100 can freely rotate about and slide along the second stay member 88.

Although obstructed from view in FIG. 10, the stay mounting tab 100 can include a through hole in each of the plate parts 122, 124 and a nut 130 welded onto the rear plate part 122 as described above and shown in FIG. 9 with respect to the nut 114 and the through holes 116 of the step mounting tab 64. FIGS. 12 and 13 show the nut 130. The bolt 128 can be inserted through the stay end 96 and the plate parts 122,124 and threaded into the nut 130 to secure of the second stay member 88 to the first stay member 86.

Material of the first stay member 86 can be pinched and plastically deformed to create a pair of ears 132 adjacent to the stay mounting tab 100. The ears 132 can restrict sliding movement of the stay mounting tab 100 and the stay end 96 of the second stay member 88 toward the main frame member 34L in the transverse direction T of the vehicle 10. The bend 94 can restrict sliding movement of the stay mounting tab 100 and the stay end 96 of the second stay member 88 away from the main frame member 34L in the transverse direction T of the vehicle 10.

The stay members 86, 88 can be formed from an appropriate material and have an appropriate shape so that the step stay 50 can support the side step cover 52 and a predetermined load applied to onto the side step cover 52, such as the weight of a user of the vehicle 10. For example, the stay members 86, 88 can be formed from a metal wire rod that has a circular cross-section. The metal wire rod can be bent into the exemplary shapes of the stay members 86, 88.

Figure 11:
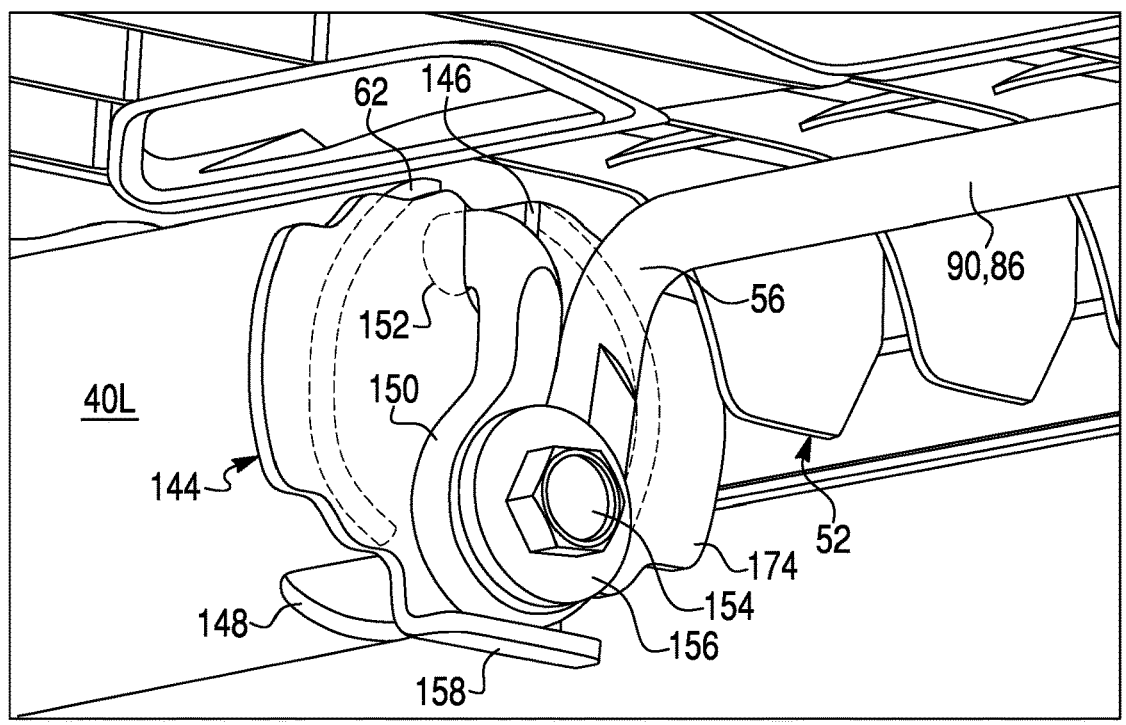
FIG. 11 is a rear perspective view of a connection between a first end of the step stay and the frame assembly of FIG. 4.

FIG. 11 shows a connection between the first end 56 of the step stay 50 and the end 62 of the left outboard frame member 40L. The end 62 of the left outboard frame member 40L can include a cap 144, an upper slot 146 and a lower slot 148. The left outboard frame member 40L can include a hollow pipe. The cap 144 can close the open end of the hollow pipe. The cap 144 can be secured to the end of the hollow pipe in an appropriate manner such as but not limited to an adhesive, mechanical fastener(s) or weld(s). The cap 144 can include a through hole and a nut welded onto the side of the cap 144 that faces the hollow pipe of the outboard frame member 40L. The through hole and nut can be similar to the through holes 116, and nuts 114, 130 described above with respect to the step mounting tab 64 and the stay mounting tab 100.

Referring to FIGS. 6, 7 and 11, the first end 56 of the first stay member 86 can include a loop 150 and a projection 152 that protrudes away from the loop 150 in the longitudinal direction L of the vehicle 10. The loop 150 and the projection 152 can be formed by bending the wire rod of the first stay member 86.

Referring to FIG. 7, the loop 150 can form a hole 166 through which one of the bolts 154 passes. Referring to FIGS. 11-13, the bolt 154 can be threaded into the nut welded onto the cap 144.

The projection 152 can extend into the upper slot 146. The projection 152 and the upper slot 146 can cooperate to form an anti-rotation structure for the first stay member 86.

The side step assembly 12 can be arranged as a side step replacement kit 12R for replacing an existing side step assembly 12 that has been damaged during operation of the vehicle 10. It is possible for the nut welded onto the cap 144 to be dislodged from the cap 144 if the existing side step assembly 12 is damaged, or during the removal of the side step assembly 12 that has been damaged. If the nut is dislodged from the cap 144, the bolt 154 can be accessed via the lower slot 148 so that a replacement nut can be threaded onto the bolt 154 and the side step replacement kit 12R can be secured to the outboard frame member 40L as intended.

The cap 144 can include a tab 158 that projects from an outer face 174 of the cap 144 in the longitudinal direction L of the vehicle 10 and extends along the outer face 174 of the cap 144 in the transverse direction T of the vehicle 10. The loop 150 can be placed on and supported by the tab 158 during assembly of the first stay member 86 onto the left outboard frame member 40L while the worker inserts the bolt 154 through the loop 150 and the cap 144. The tab 158 can be positioned relative to the through hole in the cap 144 so that the hole 166 formed by the loop 150 of the first stay member 86 aligns with the through hole in the cap 144. Thus, the tab 158 can be a height setting structure of the cap 144.

At least a portion of the loop 150 can be flattened. At least one washer 156 can be positioned between the head of the bolt 154 and the flattened surface of the loop 150. The loop 150 can also include a flattened surface that abuts the cap 144. The flattened portion(s) of the loop 150 can increase the surface area in contact with the washer 156 and the outer face 174 of the cap 144 as compared to the cylindrical surface of the remainder of the first stay member 86.

Referring to FIG. 10, the stay end 96 of the second stay member 88 can be flattened. The flattened surfaces of the stay end 96 can increase the surface area in contact area with the head of the bolt 128 and the plate part 124 of the stay mounting tab 100 as compared to the cylindrical surface of the remainder of the second stay member 88.

Referring to FIGS. 12-14, the frame member 74 can include a mounting bracket 176 that can be connected to the upright portion 76 over the frame member 74 in an appropriate manner such as but not limited to a pair of weld seams 168. Referring to FIG. 13, the mounting bracket 176 can include a nut 164 welded onto the backside of the bracket 176. The bolt 154 can be inserted through the second end 58 and threaded into the nut 164.

Referring to FIGS. 7 and 12-14, the second end 58 and the third end 60 of the step stay 50 can be flattened. The flattened surfaces of the ends 58, 60 can increase the surface area in contact with the head of the bolts 154 and the mounting brackets 85, 176 as compared to the cylindrical surface of the remainder of the first stay member 86 and the second stay member 88.

Figure 15:
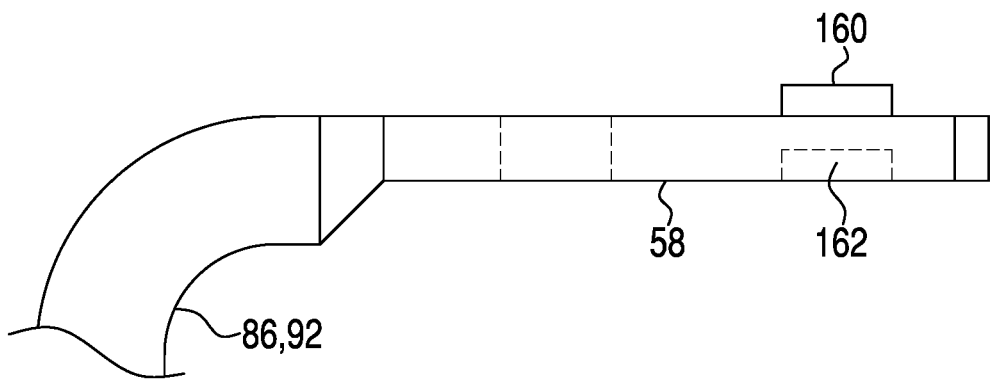
FIG. 15 is a top plan view of the second end of the step stay of FIG. 7.

Referring to FIGS. 14 and 15, a portion of each of the ends 58, 60 can be plastically deformed to form a protrusion 160 on one side of the flat portion of the ends 58, 60 and a concavity 162 on the other side of the flat portion of the ends 58, 60. Each of the mounting brackets 85 and 176 can include a hole into which the protrusion 160 extends. The hole and the protrusion 160 collectively can form an anti-rotation structure for the stay members 86, 88.

Accordingly, the frame assembly 18 and the side step assembly 12 can improve a worker's access to a center portion of the vehicle 10 during assembly of the vehicle and/or during repair or other circumstance where the space S that is exposed by the absence of the side step assembly 12 can be used by a worker, repair person, or other user. Further, the side step assembly 12 can be removably attached to the frame assembly 18. This can improve access to the vehicle 10 for maintenance on the powertrain 48 or other part(s), component(s) and/or system(s) of the vehicle 10. If the side step assembly 12 is damaged, the damaged side step assembly 12 can be easily removed from the frame assembly 18 without causing damage to the frame assembly 18. A side step assembly 12 arranged as a replacement side step assembly 12 can easily replace the damaged side step assembly 16.

While certain embodiments of the invention are described above, it should be understood that the invention can be embodied and configured in many different ways without departing from the spirit and scope of the invention.

For example, embodiments are described above in the context of the stay members 86, 88 being formed from wire rod stock that is bent and flattened into the desired shape. However, the step stay 50 can be formed from frame members having a cross-sectional size and shape similar to those of the main frame members 34L, 34R or the outboard frame members 40L, 40R. Various other structural and cross-sectional shapes can be used for the components that make up the side step assembly, including hollow tubular structures having circular, square, rectangular, triangular cross-sections, or solid bar structures having the same various cross-sections.

Embodiments are described above in the context of vehicle 10 that includes two rows of seats shown in FIG. 1. In an alternate embodiment, the vehicle 10 can be shortened by removing the rear seat frame assembly 46 and the rear seats 32L, 32R and moving the rear frame assembly 38 toward the front frame assembly 36. A cargo bed can mounted on the rear frame assembly 38 behind the front seats 30L, 30R. The side step assembly 12 can be located behind the front seats 30L, 30R in the longitudinal direction L of the vehicle 10 and adjacent to the cargo bed.

In another alternate embodiment, the vehicle 10 can be modified to include a cargo bed that is located behind the rear seats 32L, 32R and the side step assembly 12 can be located behind the rear seats 32L, 32R in the longitudinal direction L of the vehicle 10 and adjacent to the cargo bed. The cargo bed can be mounted onto the rear frame assembly 38.

Exemplary embodiments can include the rear seat frame assembly 46 extending onto the rear frame assembly 38. The powertrain 48 can be located underneath the rear seat frame assembly 46.

The powertrain 48 can include an internal combustion engine, an electric motor or a hybrid of an internal combustion engine and an electric motor. The powertrain 48 configured as an internal combustion engine or a hybrid power source can have the engine output axis oriented in the longitudinal direction L or in the traverse direction T of the vehicle 10. The engine can be mounted forward of the front axles, rearward of the rear axles, or intermediate the front and rear axles. In the exemplary embodiment of FIG. 3, the power source 48 is configured as a longitudinally-oriented rear-mounted internal combustion engine.

The powertrain 48 can include a transmission configured as an automatic transmission, a manual transmission, or a semi-automatic transmission. The transmission can be selectively driven by the engine and/or electric motor. The transmission can include a speed ratio assembly to vary the speed and torque output by the transmission. The speed ratio assembly can be a stepped speed ratio assembly or a continuously variable speed ratio assembly.

What is claimed is:

1. A side step kit for a side-by-side all-terrain vehicle having a frame assembly and a plurality of wheels connected to the frame assembly, the side step kit comprising:
   a vehicle step stay including,
      a first stay member including a first end and a second end, the first end and the second end are configured to be attached onto the frame assembly, and
      a second stay member configured to be attached to the first stay member and onto the frame assembly;
      a mounting tab connected to the first stay and spaced away from the first end and the second end; and
   a side step cover supported by the vehicle step stay when the vehicle step stay is connected to the frame assembly and the side step cover is mounted on the vehicle step stay, the side step cover includes a tread surface extending above and along the first stay member when the side step cover is mounted on the vehicle step stay, and the side step cover is fastened to the mounting tab when the side step cover is mounted on the vehicle step stay.

2. The side step kit according to claim 1, wherein the first stay member is a horizontal portion when attached onto the frame assembly, the first stay member includes,
   a first portion that has a first end that is configured to be attached onto the frame assembly, and
   a second portion that is substantially orthogonal to the first portion, the second portion has a second end that is configured to be attached onto the frame assembly, and
the second stay member is an upwardly extending member when attached onto the frame assembly.

3. The side step kit according to claim 2, wherein the first stay member includes a first bend connecting the first portion to the second portion, and
the second stay member includes a second bend that is configured to elastically deform at the second bend when an external load is applied to the second stay member.

4. The side step kit according to claim 3, further comprising:
   a first mounting tab connected onto the first stay member, the side step cover is connected to the first mounting tab; and
   a second mounting tab is connected onto the first stay member, the second stay member is pivotally connected to the second mounting tab, wherein
the first bend is located between the first mounting tab and the second mounting tab.

5. The side step kit according to claim 1, wherein the mounting tab is spaced away from the frame assembly in a transverse direction of the vehicle when the side step cover is mounted on the vehicle step stay.

6. The side step kit according to claim 1, wherein first stay member and the second stay member are wire rods having a circular cross-section.

7. A side-by-side all-terrain vehicle comprising:
   a frame assembly including:
      a first frame member extending along a longitudinal direction of the vehicle and terminating in the longitudinal direction at a first end;
      a second frame member extending beyond the first end in the longitudinal direction of the vehicle and terminating in the longitudinal direction at a second end, the second frame member is spaced away from the first frame member in a transverse direction of the vehicle;
      a third frame member mounted onto the second frame member and extending away from the second frame member along a vertical direction of the vehicle
   a step stay including,
      a first stay member connected to the first end and the second frame member, and
      a second stay member connected to the first stay member and the third frame member; and
   a side step cover mounted on and connected to the step stay and including a tread surface that extends beyond the first end of the first frame member in the longitudinal direction of the vehicle and is supported by the step stay.

8. The side-by-side all-terrain vehicle according to claim 7, wherein
the third frame member includes,
   an upright portion that is connected onto and extends away from the second frame member along a vertical direction of the vehicle,
   an extension that is connected to and extends away from the upright portion along the longitudinal direction of the vehicle, the extension is space away from the second longitudinal member in the vertical direction of the vehicle and spaced away from the first longitudinal member in the transverse direction of the vehicle, and
a support that is connected onto the extension and extends away from the extension along the transverse direction of the vehicle, and
the second stay member is connected onto the support.

9. The side-by-side all-terrain vehicle according to claim 7, further comprising:
a fourth frame member connected to and extending from the first frame member and the second frame member, the fourth frame member extends away from the first frame member and the second frame member along the transverse direction of the vehicle, wherein
the first stay member is connected to the second frame member at a location on the second frame member that is spaced away from the second end of second frame member in the longitudinal direction, and
the first frame member, the second frame member, the fourth frame member and the first stay member bound an area, and
the side step cover covers the area.

10. The side-by-side all-terrain vehicle according to claim 7, further comprising:
at least one wheel connected to the frame assembly, wherein
the first stay member includes,
a first portion that is connected to the first frame member and extends away from the first frame member along the longitudinal direction of the vehicle, and
a second portion that is connected to the third frame member and extends away from the second frame member along the transverse direction, the second portion is located between the first end and the at least one wheel in the longitudinal direction of the vehicle, and
the second stay member is located between the first end of the first frame member and the at least one wheel in the longitudinal direction of the vehicle.

11. The side-by-side all-terrain vehicle according to claim 10, wherein the first portion is substantially orthogonal to the second portion.

12. The side-by-side all-terrain vehicle according to claim 7, wherein side step cover is mounted onto the first frame member and the first stay member.

13. The side-by-side all-terrain vehicle according to claim 7, wherein
the first frame member includes a notch extending inwardly from the first end of the first frame member in the longitudinal direction,
the first stay member includes a first end connected to the first frame member and a second end connected to the second frame member, and
the first end of the first stay member includes an extension that is located in the notch.

14. The side-by-side all-terrain vehicle according to claim 13, wherein the first frame member includes a hollow tube and an end cap at the first end of the first frame member,
the notch is in the hollow tube and the end cap.

15. The side-by-side all-terrain vehicle according to claim 14, wherein
the end cap includes a tab,
the first end of the first stay member is supported on the tab,
the step stay includes a first mounting tab connected on the first stay member, and
a second mounting tab connected on the first stay member,
the side step cover is connected to the first stay member at the first mounting tab, and
and the second stay member is connected to the second mounting tab.

16. A vehicle, comprising:
a frame assembly;
a plurality of wheels connected to the frame assembly, at least one of the wheels is separated from the frame assembly in a longitudinal direction of the vehicle by a space;
a power source mounted on the frame assembly and selectively connected to the at least one of the wheels to selectively propel the vehicle;
a plurality of stay members attached to the frame assembly, the stay members are located in the space; and
a side step cover fastened onto the frame assembly and fastened onto one of the stay members and including a tread surface that extends from the frame assembly and onto one of the stay members in the longitudinal direction of the vehicle.

17. The vehicle according to claim 16, wherein the plurality of stay members includes a first wire rod that lies in a plane extending in a traverse direction of the vehicle and the longitudinal direction of the vehicle.

18. The vehicle according to claim 16, wherein the plurality of stay members includes,
a first wire rod that is bent into an L-shape and includes a first end connected to the frame assembly at a first location on the frame assembly and a second end connected to the frame assembly at a second location that is spaced away from the first location in the longitudinal direction of the vehicle and a transverse direction of the vehicle, and
a second wire rod that is connected to the first wire rod and the frame assembly at a third location that is spaced away from the second location in a vertical direction of the vehicle, and the second rod is inclined relative to the vertical direction of the vehicle.

19. The vehicle according to claim 18, wherein the second wire rod includes,
a first end mounted on the first wire rod,
a second end mounted on the frame assembly, and
a bend located closer to the second end of the second wire rod than the first end of the second wire rod, the second rod is configured to elastically deform at the bend when an external load is applied to the second wire rod.

20. The vehicle according to claim 16, wherein
the side step cover includes
a first wall that extends away from the tread surface along a vertical direction of the vehicle and extends in a transverse direction of the vehicle, and
a second wall that extends away from the tread surface along a vertical direction of the vehicle and extends in the longitudinal direction of the vehicle,
the plurality of stay members includes,
a first stay member located between the first wall and the at least one wheel in the longitudinal direction of the vehicle, and
a second stay member, the second wall is between a second stay member and the frame assembly in the transverse direction of the vehicle.

* * * * *